US012767849B2

(12) United States Patent
Frankel et al.

(10) Patent No.: US 12,767,849 B2
(45) **Date of Patent: *Oct. 20, 2026**

(54) AQUEOUS BLEND OF PIGMENT AND AN ALKOXYLATED AMINE

(71) Applicant: Rohm and Haas Company, Collegeville, PA (US)

(72) Inventors: Erica A. Frankel, Audubon, PA (US); Tara L. Conley, Chalfont, PA (US)

(73) Assignee: Rohm and Haas Company, Collegeville, PA (US)

(*) Notice: Subject to any disclaimer, the term of this patent is extended or adjusted under 35 U.S.C. 154(b) by 435 days.

This patent is subject to a terminal disclaimer.

(21) Appl. No.: 18/260,626

(22) PCT Filed: Jan. 20, 2022

(86) PCT No.: PCT/US2022/013087
§ 371 (c)(1),
(2) Date: Jul. 7, 2023

(87) PCT Pub. No.: WO2022/164703
PCT Pub. Date: Aug. 4, 2022

(65) Prior Publication Data
US 2024/0084156 A1 Mar. 14, 2024

Related U.S. Application Data

(60) Provisional application No. 63/142,141, filed on Jan. 27, 2021.

(51) Int. Cl.
*C09D 17/00* (2006.01)
*C08K 3/22* (2006.01)
*C09D 7/45* (2018.01)
*C09D 7/61* (2018.01)
*C09D 7/63* (2018.01)

(52) U.S. Cl.
CPC ............ *C09D 17/008* (2013.01); *C09D 7/45* (2018.01); *C09D 7/61* (2018.01); *C09D 7/63* (2018.01); *C09D 17/001* (2013.01); *C08K 2003/2241* (2013.01); *C08K 2201/019* (2013.01)

(58) Field of Classification Search
CPC .......... C09D 17/008; C09D 7/45; C09D 7/61; C09D 7/63; C09D 17/001; C09D 17/007; C08K 2003/2241; C08K 2201/019; C08K 3/34; C08K 5/17; A01N 25/04; A01P 1/00; C09C 1/24; C09C 1/26; C09C 1/3669; C09C 1/42; C09C 1/56; C09C 1/405; C09C 3/08
See application file for complete search history.

(56) References Cited

U.S. PATENT DOCUMENTS 4,340,509 A * 7/1982 Canale ..................... B41N 3/08 101/463.1
5,270,380 A * 12/1993 Adamson .................. C08F 8/44 524/561
6,060,521 A * 5/2000 Sekutowski ........... A01N 59/06 516/77
6,218,012 B1 * 4/2001 Rota ........................ C09D 7/61 524/565
7,553,882 B2 6/2009 Gernon
8,137,659 B2 * 3/2012 Kessell .................... B82Y 5/00 424/59
9,695,071 B2 7/2017 Spurlock
2004/0116562 A1 * 6/2004 Winter ............... C08G 65/2603 524/186
2007/0048345 A1 * 3/2007 Huang ................... A01N 31/02 514/738
2007/0269467 A1 * 11/2007 Leatherman ............. C09D 7/45 424/401
2007/0295247 A1 12/2007 Remortel et al.
2009/0123507 A1 5/2009 Ohrlein et al.
2012/0165428 A1 * 6/2012 Tilara ................... C09D 133/06 523/400
2013/0217780 A1 * 8/2013 Lallier ...................... C02F 1/50 106/18.32
2021/0155816 A1 * 5/2021 Nasu ........................ A61K 8/29

FOREIGN PATENT DOCUMENTS

EP 3403505 11/2018
ES 22221383 T3 * 2/2005
JP 2019044069 A * 3/2019 ............. B41M 5/00
WO 2015097456 7/2015

OTHER PUBLICATIONS

ES222138 Machine translation (Year: 2005).*
Research on the Influence of the Type of Surfactant and Concentrator in Aqueous Dispersion of Pigments Edwin Makarewicz, Agnieszka Michalik First published: Aug. 18, 2013 Journal of Surfactants and Detrgents vol. 17 Issue 4 pp. 773-784 (Year: 2013).*

* cited by examiner

*Primary Examiner* — Pamela H Weiss

(57) ABSTRACT

The present invention is composition comprising water, a pigment, and a compound of Formula I:

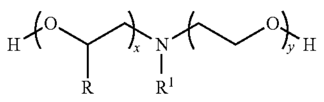

I wherein R, $R^1$, x, and y are as defined herein.
The present invention addresses a need in the art by providing an aqueous inorganic pigment solution or dispersion that does require biocide to resist promotion of microbial growth.

8 Claims, No Drawings

AQUEOUS BLEND OF PIGMENT AND AN ALKOXYLATED AMINE

BACKGROUND OF THE INVENTION

The present invention relates to an aqueous blend of a pigment and an alkoxylated amine. The composition provides an aqueous blend of a pigment and an alkoxylated amine that is resistant to microbial growth in the absence of a biocide.

$TiO_2$ is the opacifying pigment of choice for paint formulations. $TiO_2$ can be added to a formulation as a dry powder or as an aqueous slurry. A slurry requires a preservative, most prevalently isothiazolinones, to prevent microbial contamination during production and storage. However, isothiazolinones are known skin sensitizers that have come under increased scrutiny by regulators for use in a variety of consumer products. In 2016, the European Commission issued a directive to limit the use of methylisothiazolinone (MIT) in most consumer products, including house paint. By 2021, the EU will not permit final formulations of these products to contain more than 15 ppm of MIT. These stringent restrictions present a challenge for paint formulators looking to control the amount of biocide in their final product. It would therefore be an advance in the art of architectural coatings to discover a way to preserve inorganic pigment containing slurries without using biocides.

SUMMARY OF THE INVENTION

The present invention addresses a need in the art by providing a composition comprising, based on the weight of the composition, from 18 to 80 weight percent water, from 18 to 80 weight percent of a pigment, and from 50 ppm to 5000 ppm of a compound of Formula I:

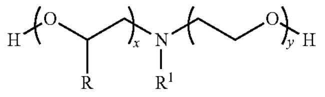

I wherein each R is independently H, methyl, or ethyl;

$R^1$=—$R^2$—$NR^3$—$(CH_2CH_2O)_z$—H; or —$C_6$-$C_{18}$; or —$C(CH_3)_2R_4$;

x is from 1 to 40; y is from 0 to 39; and z is from 0 to 39;

with the proviso that when y is 0, $R^1$ is —$C(CH_3)_2R^4$; and when y is from 1 to 39, $R^1$ is —$R^2$—$NR^3$—$(CH_2CH_2O)_y$—H or —$C_6$-$C_{18}$;

$R^2$ is —$CH_2CH_2CH_2$— or —$CH(CH_3)CH_2$— or —$CH_2CH(CH_3)$—;

$R^3$ is saturated or partially unsaturated $C_{10}$-$C_{22}$-alkyl;

$R^4$ is $C_1$-$C_{20}$-alkyl; and x+y+z=1 to 40;

with the proviso that the water and the pigment comprise at least 95 percent by weight of the composition; and with the further proviso that when y is 0 and x is 1, the composition comprises less than 100 ppm of a biocide.

The present invention addresses a need in the art by providing an aqueous inorganic pigment solution or dispersion that does require biocide to resist promotion of microbial growth.

DETAILED DESCRIPTION OF THE INVENTION

The present invention is a composition comprising, based on the weight of the composition, from 18 to 80 weight percent water, from 18 to 80 weight percent of a pigment, and from 50 ppm to 5000 ppm of a compound of Formula I:

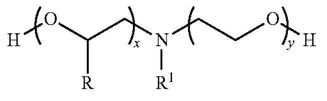

I wherein each R is independently H, methyl, or ethyl;

$R^1$=—$R^2$—$NR^3$—$(CH_2CH_2O)_z$—H; or —$C_6$-$C_{18}$; or —$C(CH_3)_2R_4$;

x is from 1 to 40; y is from 0 to 39; and z is from 0 to 39;

with the proviso that when y is 0, $R^1$ is —$C(CH_3)_2R^4$; and when y is from 1 to 39, $R^1$ is —$R^2$—$NR^3$—$(CH_2CH_2O)_y$—H or —$C_6$-$C_{18}$;

$R^2$ is —$CH_2CH_2CH_2$— or —$CH(CH_3)CH_2$— or —$CH_2CH(CH_3)$—;

$R^3$ is saturated or partially unsaturated $C_{10}$-$C_{22}$-alkyl;

$R^4$ is $C_1$-$C_{20}$-alkyl; and x+y+z=1 to 40;

with the proviso that the water and the pigment comprise at least 95 percent by weight of the composition; and with the further proviso that when y is 0 and x is 1, the composition comprises less than 100 ppm of a biocide.

Pigments include opacifying inorganic pigments such as $TiO_2$ and ZnO; inorganic extenders such as talc, clay, mica, sericite, nepheline syenite, feldspar, wollastonite, kaolinite, and diatomaceous earth; and inorganic and organic colorants such as phthalocyanine blue, phthalocyanine green, monoarylide yellow, diarylide yellow, benzimidazolone yellow, heterocyclic yellow, quinacridone magenta, quinacridone violet, metallized azo reds, nonmetallized azo reds, carbon black, lampblack, black iron oxide, yellow iron oxide, brown iron oxide, and red iron oxide. $TiO_2$ is an especially preferred opacifying inorganic pigment, and nepheline syenite is an especially preferred inorganic extender.

The preferred concentration of opacifying pigment, preferably $TiO_2$, is in the range of from 60, more preferably from 65, and most preferably from 70 weight percent to 79, more preferably to 78 weight percent, based on the weight of the composition. Correspondingly, the concentration of water in a $TiO_2$-water dispersion is preferably is in the range of from 19, more preferably from 20 weight percent, to 38, more preferably to 33, and most preferably to 28 weight percent, based on the weight of the composition. Where the pigment is an inorganic extender, preferably nepheline syenite, the preferred concentration is in the range of from 20 to 50 weight percent, and the preferred concentration of water is in the range of from 48 to 78 weight percent.

Where y is 0, the compound of Formula I is preferably represented by Formula Ia:

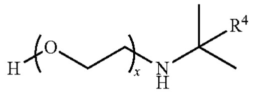

where $R^4$ is preferably $C_6$-$C_{14}$-alkyl, and x=2 to 30, more preferably 2 to 10, and most preferably 2 to 5. Examples of commercial surfactants within the scope of Formula Ia include TRITON™ RW-20 (RW-20, x=2, $R^4$=decyl), TRITON™ RW-50 (RW-50, x=5, $R^4$=decyl), and TRITON™

RW-150 (RW-150, x=15, $R^4$=decyl) Surfactants. (TRITON is a Trademark of The Dow Chemical Company or its Affiliates.)

In another aspect, the concentration of the compound of Formula I is from 100 ppm, in another aspect from 150 ppm, and in another aspect from 200 ppm; to preferably 2000 ppm, more preferably to 1500 ppm.

Another subgenus of the compound of Formula I is represented by Formula Ib:

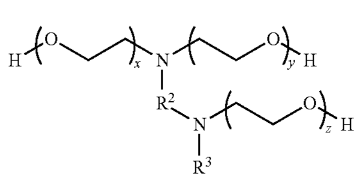

where $R^3$ is preferably saturated or partially saturated $C_{14}$-$C_{20}$-alkyl, more preferably saturated or partially saturated $C_{16}$-$C_{18}$-alkyl, and x+y+z=2 to 32. As used herein, "partially unsaturated" refers to the presence of one or two double bond within the alkyl chain. Examples of commercial surfactants within the scope of Formula Ib include Ethox DT-15 (DT-15, x+y+z=15); and Ethox DT-30 (DT-30, x+y+z=30) Tallow diamines.

Yet another subgenus of the surfactant of Formula I is illustrated by Formula Ic:

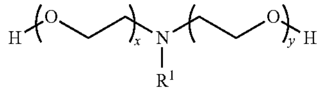

where $R^1$ is preferably $C_{12}$-$C_{18}$-alkyl, and x+y=12 to 18. An example of a commercial surfactant within the scope of Formula Ic is Ethox CAM-15 Cocoamine (CAM-15, x+y=15).

The pH of the composition is preferably in the range of from 8, more preferably from 8.5, to 10, more preferably to 9.5. The desired pH is conveniently achieved by addition of a neutralizer such as an alkali metal hydroxide, ammonia, an alkyl amine, or an alkanol amine.

The composition of the present invention may further include other materials such dispersants, surfactants, and humectants. Preferably the pigment, water, and the compound of Formula I comprise at least 98 weight percent of the composition.

It has been surprisingly discovered that slurries of pigments can be formulated in the absence of or substantial absence of biocides, yet remain unsusceptible to microbial contamination. Accordingly, the composition of the present invention comprises less than 100 ppm of a biocide where in the compound of Formula I y is 0 and x is 1; for all values of x and y, the composition preferably comprises less than 100 ppm, more preferably less than 20 ppm, more preferably less than 5 ppm, more preferably less than 1 ppm, and most preferably 0 ppm of a biocide such as an isothiazolinone, a triazine, an aldehyde, and a phenolic.

Preparation of Samples for Microbial Resistance

All samples were prepared on a speedmixer (Flaktek, Inc.). Water, inorganic pigment, surfactant, and neutralizer were added and mixed at 1500 rpm for 2 min. Samples were inoculated 3 times at 7-d intervals with $10^6$-$10^7$ colony forming units per milliliter of sample (CFU/mL) of a standard pool of bacteria, yeasts, and molds obtained from American Type Culture Collection (ATCC) that are common contaminants in coatings. Once inoculated, the samples were stored in 25° C. incubators. Test samples were monitored for microbial contamination by agar plating using a standard streak plate method. Samples were plated 1 d and 7 d after each microbial challenge onto trypticase soy agar (TSA) and potato dextrose agar (PDA) plates. All agar plates were checked daily up to 7 d after plating to determine the number of microorganisms surviving in the test samples. When not being checked, the agar plates were stored in incubators, 30° C. for TSA plates and 25° C. for PDA plates. The extent of microbial contamination was established by counting the colonies, where the rating score was determined from the number of microbial colonies observed on the agar plates. Reported results come from day 7 readings. Results are described by the rating score for each type of microorganism: B=bacteria, Y=yeast, and M=mold. For example, a 3B describes a plate with 3 rating score for bacteria, or a Tr Y(1) describes a plate with trace yeast (1 colony on plate). Table 1 illustrates the rating system used to estimate the level of microbial contamination on streak plates. Colonies refers to the number of colonies on the plate.

TABLE 1

Rating system for estimating microbial contamination

| Colonies | Rating Score | Contamination | Result |
|---|---|---|---|
| None | 0 | None | Pass |
| 1-9 | Tr | Trace | Pass |
| 10 to 99 | 1 | Very Light | Fail |
| 100 to ~1000 | 2 | Light | Fail |
| ~1000 to 10,000 | 3 | Moderate | Fail |
| >10,000 | 4 | Heavy | Fail |

EXAMPLES

In Table 1, "Pass" means that no microbial growth was detected on plates 14 d after the inoculation. "Fail means that more than five distinct colonies were detected on plates 14 days d inoculation. $C_1$, $C_2$ and $C_3$ refer to challenge 1, challenge 2 and challenge 3. A sample that failed challenges 1 and 2 was not subjected to challenge 3. $TiO_2$ refers to Ti-Pure R-706 Titanium Dioxide, RW-20 refers to TRITON™ RW-20 Surfactant, (A Trademark of The Dow Chemical Company or its Affiliates), and Minex 4 refers to Minex 4 nepheline syenite.

TABLE 1

Slurry Formulations with and without Ethoxylated Amine

| Comp. 1 | Pigment | RW-20 | C1 | C2 | C3 |
|---|---|---|---|---|---|
| Ex. 1 | $TiO_2$ | none | Fail | Fail | NA |
| Ex. 2 | $TiO_2$ | 250 ppm | Pass | Pass | Pass |
| Ex. 3 | $TiO_2$ | 5000 ppm | Pass | Pass | Pass |
| Ex. 4 | Minex 4 | 1250 ppm | Pass | Pass | Pass |

The data show the impact of the ethoxylated amine of suppression of microbial growth over three challenge tests.

The invention claimed is:

1. A composition comprising, based on the weight of the composition, from 18 to 80 weight percent water, from 18 to 80 weight percent of an inorganic pigment, and from 50 ppm to 5000 ppm of a compound of Formula I:

I

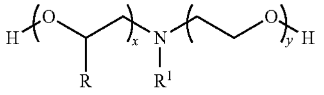

wherein each R is independently H, methyl, or ethyl;

$R^1$=$R^2$—$NR^3$—$(CH_2CH_2O)_z$—H; or —$C_6$-$C_{18}$; or —$C(CH_3)_2R^4$, x is from 1 to 40; y is from 0 to 39; and z is from 0 to 39;

with the proviso that when y is 0, $R^1$ is —$C(CH_3)_2R^4$; and when y is from 1 to 39, $R^1$ is -$R^2$—$NR^3$—$(CH_2CH_2O)_y$—H or —$C_6$-$C_{18}$;

$R^2$ is —$CH_2CH_2CH_2$— or —$CH(CH_3)CH_2$— or —$CH_2CH(CH_3)$—;

$R^3$ is saturated or partially unsaturated $C_{10}$-$C_{22}$-alkyl;

$R^4$ is $C_1$-$C_{20}$-alkyl; and x+y+z=1 to 40;

with the proviso that the water and the inorganic pigment comprise at least 95 percent by weight of the composition; and with the further proviso that when y is 0 and x is 1, the composition comprises less than 100 ppm of a biocide selected from the group consisting of an isothiazolinone, a triazine, an aldehyde, and a phenolic.

2. The composition of claim 1, wherein the inorganic pigment is an opacifying pigment which is an aqueous dispersion of an opacifying pigment having a concentration in the range of from 60 to 79 weight percent, based on the weight of the composition; wherein the composition has a pH in the range of from 8 to 10.

3. The composition of claim 2 wherein the opacifying pigment is $TiO_2$ having a concentration in the range of from 70 to 78 weight percent, based on the weight of the composition; wherein the concentration of the water is in the range of from 20 to 28 percent; wherein the concentration of the compound of Formula I is in the range of from 50 ppm to 2000 ppm; wherein the composition has a pH in the range of 8.5 to 9.5; and wherein the $TiO_2$, the water, and the compound of Formula I comprise at least 98 weight percent of the composition.

4. A composition comprising, based on the weight of the composition, from 20 to 28 weight percent water, from 70 to 78 weight percent of an inorganic pigment, and from 50 ppm to 2000 ppm of a compound of Formula Ia:

Ia

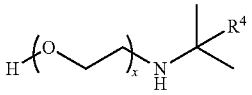

wherein each R is independently H, methyl, or ethyl;

$R^1$=—$R^2$—$NR^3$—$(CH_2CH_2O)_2$—H; or —$C_6$-$C_{18}$; or —$C(CH_3)_2R^4$;

x is from 2 to 30; y is from 0 to 39; and z is from 0 to 39;

with the proviso that when y is 0, $R^1$ is —$C(CH_3)_2R^4$; and when y is from 1 to 39, $R^1$ is —$R^2$—$NR^3$—$(CH_2CH_2O)_y$—H or —$C_6$-$C_{18}$;

$R^2$ is —$CH_2CH_2CH_2$— or —$CH(CH_3)CH_2$— or —$CH_2CH(CH_3)$—;

$R^3$ is saturated or partially unsaturated $C_{10}$-$C_{22}$-alkyl;

$R^4$ is $C_6$-$C_{14}$-alkyl; and x+y+z=1 to 40;

with the proviso that the water and the inorganic pigment comprise at least 95 percent by weight of the composition;

with the further proviso that when y is 0 and x is 1, the composition comprises less than 100 ppm of a biocide selected from the group consisting of an isothiazolinone, a triazine, an aldehyde, and a phenolic;

wherein the inorganic pigment is an aqueous dispersion of $TiO_2$;

wherein the inorganic pigment, the water, and the compound of Formula I comprise at least 98 weight percent of the composition; and wherein the composition has a pH in the range of from 8.5 to 8.5.

5. The composition of claim 4 wherein $R^4$ is decyl and x=2 to 10.

6. The composition of claim 1 wherein the inorganic pigment is an inorganic extender.

7. A composition comprising, based on the weight of the composition, from 48 to 78 weight percent water, from 20 to 50 weight percent of nepheline syenite, and from 50 ppm to 2000 ppm of a compound of Formula Ia:

Ia

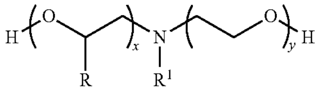

wherein each R is independently H, methyl, or ethyl;

$R^1$=—$R^2$—$NR^3$—$(CH_2CH_2O)_z$—H; or —$C_6$-$C_{18}$; or —$C(CH_3)_2R^4$;

x is from 2 to 30; y is from 0 to 39; and z is from 0 to 39;

with the proviso that when y is 0, $R^1$ is —$C(CH_3)_2R^4$; and when y is from 1 to 39, $R^1$ is —$R^2$—$NR^3$—$(CH_2CH_2O)_y$—H or —$C_6$-$C_{18}$;

$R^2$ is —$CH_2CH_2CH_2$— or —$CH(CH_3)CH_2$— or —$CH_2CH(CH_3)$—;

$R^3$ is saturated or partially unsaturated $C_{10}$-$C_{22}$-alkyl;

$R^4$ is $C_6$-$C_{14}$-alkyl; and x+y+z=1 to 40;

with the proviso that the water and the inorganic pigment comprise at least 95 percent by weight of the composition; and wherein the composition comprises less than 5 ppm of a biocide selected from a group consisting of an isothiazolinone, a triazine, an aldehyde, and a phenolic.

8. The composition of claim 1 wherein the pigment is a colorant, wherein the colorant, the water, and the compound of Formula I comprise at least 98 weight percent of the composition.

* * * * *